United States Patent
Leara et al.

(10) Patent No.: US 10,402,169 B2
(45) Date of Patent: Sep. 3, 2019

(54) METHOD AND SYSTEM OF SECURE RANDOM SEED GENERATION FOR A CRYPTOGRAPHICALLY SECURE PSEUDO-RANDOM NUMBER GENERATOR

(71) Applicant: Dell Products L.P., Round Rock, TX (US)

(72) Inventors: William D. Leara, Round Rock, TX (US); Richard Christopher Thompson, Cedar Park, TX (US); Nikhil Manohar Vichare, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 224 days.

(21) Appl. No.: 15/648,234

(22) Filed: Jul. 12, 2017

(65) Prior Publication Data
US 2019/0238329 A1  Aug. 1, 2019

(51) Int. Cl.
*H04L 9/00* (2006.01)
*G06F 7/58* (2006.01)
*H03K 3/84* (2006.01)

(52) U.S. Cl.
CPC ............ *G06F 7/58* (2013.01); *G06F 7/582* (2013.01); *G06F 7/588* (2013.01); *H03K 3/84* (2013.01); *H04L 9/00* (2013.01)

(58) Field of Classification Search
CPC .. H01L 9/00; H03K 3/84; G06F 7/582; G06F 7/588; G06F 7/58
USPC ............ 380/44, 46; 708/254, 250, 255
See application file for complete search history.

(56) References Cited

U.S. PATENT DOCUMENTS

| | | | | |
|---|---|---|---|---|
| 5,206,905 | A * | 4/1993 | Lee | G06F 3/0383 340/5.26 |
| 7,007,050 | B2 * | 2/2006 | Saarinen | G06F 7/588 380/44 |
| 7,512,241 | B2 * | 3/2009 | Vaudenay | H04L 9/0668 380/277 |
| 8,019,802 | B2 * | 9/2011 | Rose | G06F 7/58 708/254 |
| 8,510,571 | B1 * | 8/2013 | Chang | G06F 21/54 713/187 |
| 8,752,156 | B1 * | 6/2014 | Van Dijk | H04W 12/06 726/9 |
| 10,007,488 | B2 * | 6/2018 | Kawai | G06F 7/584 |
| 2002/0172359 | A1 * | 11/2002 | Saarinen | G06F 7/588 380/46 |
| 2003/0128843 | A1 * | 7/2003 | Brown | G06F 21/72 380/46 |

(Continued)

FOREIGN PATENT DOCUMENTS

JP    2009031853 A  *  2/2009

OTHER PUBLICATIONS

Rukhin, Andrew, et al. A statistical test suite for random and pseudorandom number generators for cryptographic applications. Booz-Allen and Hamilton Inc Mclean Va, 2001.

(Continued)

*Primary Examiner* — Viet Q Nguyen
(74) *Attorney, Agent, or Firm* — Baker Botts L.L.P.

(57) ABSTRACT

A method and system for generating a secure random seed uses chemical processes in a battery of an information handling system as an entropy source for randomness. The secure random seed may be used by a pseudo-random number generator to create a secure pseudorandom bit stream usable to generate secure encryption keys.

16 Claims, 3 Drawing Sheets

(56) References Cited

U.S. PATENT DOCUMENTS

| | | | | |
|---|---|---|---|---|
| 2007/0230694 A1* | 10/2007 | Rose | ............ | G06F 7/58 |
| | | | | 380/46 |
| 2010/0036900 A1* | 2/2010 | Ross | ............ | G06F 7/58 |
| | | | | 708/254 |
| 2013/0287270 A1* | 10/2013 | Harper | ............ | G06K 9/00073 |
| | | | | 382/124 |
| 2013/0287271 A1* | 10/2013 | Harper | ............ | G06K 9/00067 |
| | | | | 382/124 |
| 2016/0112518 A1* | 4/2016 | Haleem | ............ | H04W 4/70 |
| | | | | 713/168 |
| 2018/0101360 A1* | 4/2018 | Kawai | ............ | G06F 7/584 |
| 2018/0270045 A1* | 9/2018 | Almuhammadi | ............ | H04L 9/002 |

OTHER PUBLICATIONS

"Critical RNG Flaw Fixed in GnuPG." Pindrop, Sep. 8, 2017, www.pindrop.com/blog/critical-rng-flaw-fixed-in-gnupg/.

Mimoso, Michael. "GPG Patches 18-Year-Old Libgcrypt RNG Bug." Threatpost | The first stop for security news, Aug. 18, 2016, threatpost.com/gpg-patches-18-year-old-libgcrypt-mg-bug/119984/.

Barker, Elaine B., and John Michael Kelsey. "Recommendation for random number generation using deterministic random bit generators." US Department of Commerce, Technology Administration, National Institute of Standards and Technology, Computer Security Division, Information Technology Laboratory, 2007.

Stallings, William. "Cryptography and network security: principles and practices." Pearson, 6th Ed, 2014.

UEFI, "Unified Extensible Firmware Interface (UEFI) Specification", Retrieved from <http://uefi.org> May 2017; 2899 pages.

* cited by examiner

METHOD AND SYSTEM OF SECURE RANDOM SEED GENERATION FOR A CRYPTOGRAPHICALLY SECURE PSEUDO-RANDOM NUMBER GENERATOR

BACKGROUND

Field of the Disclosure

This disclosure relates generally to information handling systems and, more particularly, to a method and system of secure random seed generation for a cryptographically secure pseudo-random number generator (PRNG).

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and include a display device.

Furthermore, user of information handling systems use cryptography to protect data, which is a key aspect for the transaction of business using digital technology. A fundamental component of a cryptographic system and method is a random number generator. Random numbers are used for cryptographic functions such as key generation and nonce creation. Generating suitable random numbers, however, is a significant challenge for a deterministic machine, such as an information handling system. Furthermore, insufficiently secure random numbers may be a security vulnerability and may facilitate malicious hacking of cryptographic algorithms.

SUMMARY

In one aspect, a disclosed information handling system includes a main processor, a battery, and an embedded controller (EC). The EC may further include an EC processor and memory media accessible to the EC processor and storing instructions executable by the EC processor. The instructions may include instructions for determining a first cell voltage of the battery as a 16-bit value, determining a second cell voltage of the battery as a 16-bit value, and concatenating the first cell voltage and the second cell voltage to obtain a cell voltage value as a 32-bit value. The instructions may further include instructions for determining a remaining battery capacity of the battery as a 16-bit value, determining a battery voltage of the battery as a 16-bit value, determining a relative state of charge (SOC) of the battery as a 32-bit value, and determining an absolute SOC of the battery as a 32-bit value. Based on the determined values, the instructions may further include instructions for performing an exclusive or (XOR) of the cell voltage value with the remaining battery capacity to generate a first value as a 32-bit value, performing an XOR of the first value with the battery voltage to generate a second value as a 32-bit value, performing an XOR of the relative SOC left-shifted by one bit with the absolute SOC to generate a third value as a 32-bit value, shifting the third value to most significant bits of a 64-bit value to generate a fourth value, and performing an XOR of the fourth value with the second value to generate a 64-bit secure random seed, wherein an entropy source for the secure random seed includes the battery.

In any of the disclosed implementations of the information handling system, determining the first cell voltage may further include obtaining a cell voltage in Volts from a measurement of the first cell, and using least significant 16-bits of the cell voltage as the first cell voltage.

In any of the disclosed implementations of the information handling system, determining the second cell voltage may further include obtaining a cell voltage in Volts from a measurement of the second cell, and using least significant 16-bits of the cell voltage as the second cell voltage.

In any of the disclosed implementations of the information handling system, determining the remaining battery capacity may further include obtaining a remaining battery capacity value in milliwatt hours from a measurement of the battery, and using least significant 16-bits of the remaining battery capacity value as the remaining battery capacity.

In any of the disclosed implementations of the information handling system, determining the battery voltage may further include obtaining a battery voltage value in Volts from a measurement of the battery, and using least significant 16-bits of the battery voltage value as the battery voltage.

In another aspect, a method for secure communication is disclosed. The method may include determining a first cell voltage of a battery of an information handling system as a 16-bit value, determining a second cell voltage of the battery as a 16-bit value, and concatenating the first cell voltage and the second cell voltage to obtain a cell voltage value as a 32-bit value. The method may further include determining a remaining battery capacity of the battery as a 16-bit value, determining a battery voltage of the battery as a 16-bit value, determining a relative state of charge (SOC) of the battery as a 32-bit value, and determining an absolute SOC of the battery as a 32-bit value. Based on the values determined, the method may include performing an exclusive or (XOR) of the cell voltage value with the remaining battery capacity to generate a first value as a 32-bit value, performing an XOR of the first value with the battery voltage to generate a second value as a 32-bit value, performing an XOR of the relative SOC left-shifted by one bit with the absolute SOC to generate a third value as a 32-bit value, shifting the third value to most significant bits of a 64-bit value to generate a fourth value, and performing an XOR of the fourth value with the second value to generate a 64-bit secure random seed. In the method, an entropy source for the secure random seed may include the battery. Based on the secure random seed, the method may further include inputting the secure random seed to a pseudo-random number generator to generate a 64-bit pseudorandom bit stream, generating an encryption key using the 64-bit pseudo-random bit stream as an input, and using the encryption key to encrypt a network communication sent by the information handling system.

In any of the disclosed implementations of the method, determining the first cell voltage may further include obtaining a cell voltage in Volts from a measurement of the first cell, and using least significant 16-bits of the cell voltage as the first cell voltage.

In any of the disclosed implementations of the method, determining the second cell voltage may further include obtaining a cell voltage in Volts from a measurement of the second cell, and using least significant 16-bits of the cell voltage as the second cell voltage.

In any of the disclosed implementations of the method, determining the remaining battery capacity may further include obtaining a remaining battery capacity value in milliwatt hours from a measurement of the battery, and using least significant 16-bits of the remaining battery capacity value as the remaining battery capacity.

In any of the disclosed implementations of the method, determining the battery voltage may further include obtaining a battery voltage value in Volts from a measurement of the battery, and using least significant 16-bits of the battery voltage value as the battery voltage.

In yet another aspect, non-transitory computer readable memory media storing instructions executable by a processor are disclosed. In the memory media, the instructions may include instructions for determining a first cell voltage of a battery of an information handling system as a 16-bit value, determining a second cell voltage of the battery as a 16-bit value, and concatenating the first cell voltage and the second cell voltage to obtain a cell voltage value as a 32-bit value. In the memory media, the instructions may further include instructions for determining a remaining battery capacity of the battery as a 16-bit value, determining a battery voltage of the battery as a 16-bit value, determining a relative state of charge (SOC) of the battery as a 32-bit value, determining an absolute SOC of the battery as a 32-bit value, performing an exclusive or (XOR) of the cell voltage value with the remaining battery capacity to generate a first value as a 32-bit value, performing an XOR of the first value with the battery voltage to generate a second value as a 32-bit value, performing an XOR of the relative SOC left-shifted by one bit with the absolute SOC to generate a third value as a 32-bit value, shifting the third value to most significant bits of a 64-bit value to generate a fourth value; and performing an XOR of the fourth value with the second value to generate a 64-bit secure random seed. An entropy source for the secure random seed may include the battery.

In any of the disclosed implementations of the memory media, determining the first cell voltage may further include obtaining a cell voltage in Volts from a measurement of the first cell, and using least significant 16-bits of the cell voltage as the first cell voltage.

In any of the disclosed implementations of the memory media, determining the second cell voltage may further include obtaining a cell voltage in Volts from a measurement of the second cell, and using least significant 16-bits of the cell voltage as the second cell voltage.

In any of the disclosed implementations of the memory media, determining the remaining battery capacity may further include obtaining a remaining battery capacity value in milliwatt hours from a measurement of the battery, and using least significant 16-bits of the remaining battery capacity value as the remaining battery capacity.

In any of the disclosed implementations of the memory media, determining the battery voltage may further include obtaining a battery voltage value in Volts from a measurement of the battery, and using least significant 16-bits of the battery voltage value as the battery voltage.

In any of the disclosed implementations of the memory media, the processor may be an embedded controller processor in an information handling system that further comprises a main processor.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
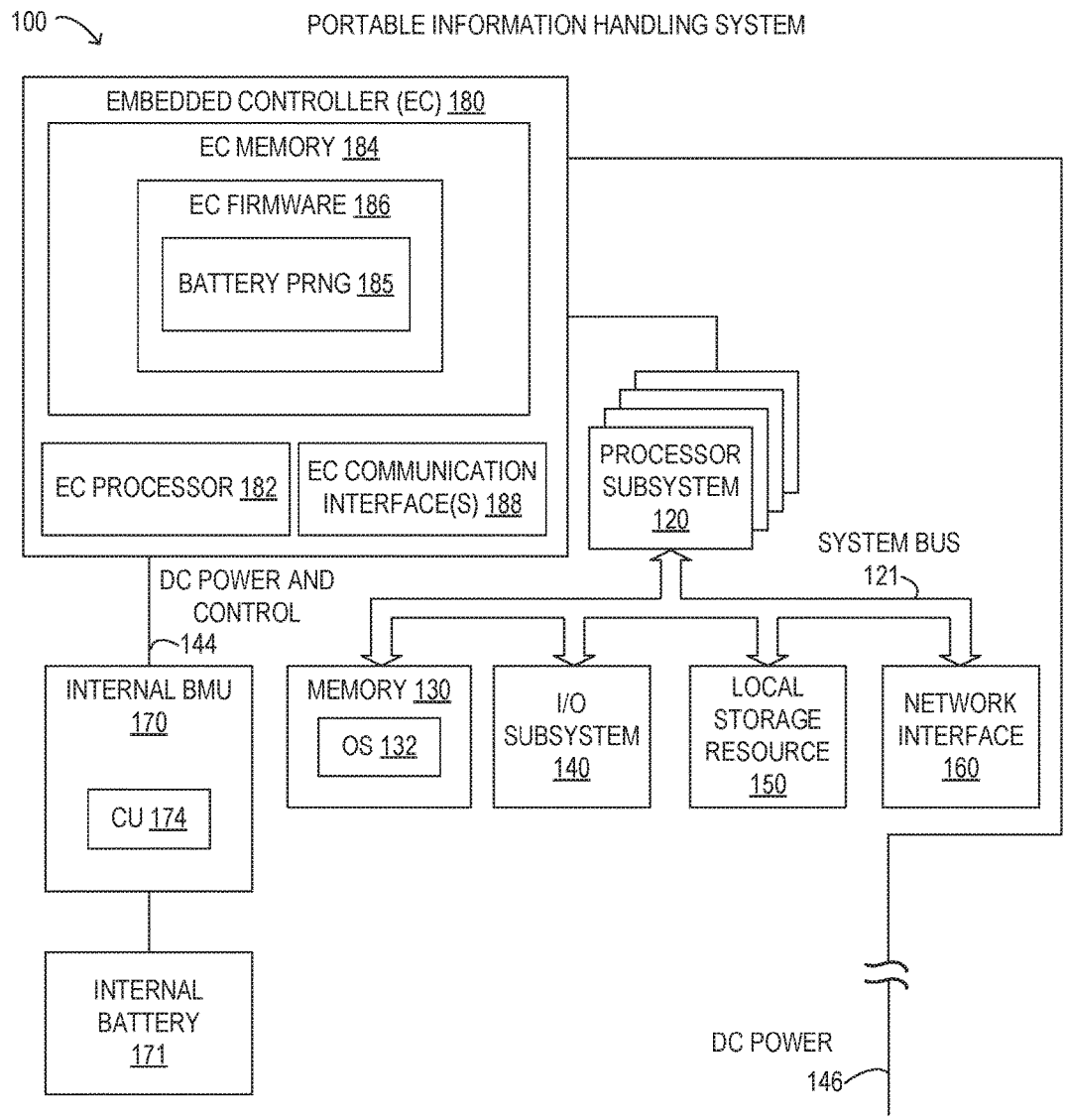
FIG. 1 is a block diagram of selected elements of an embodiment of a portable information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

As noted, information handling systems and related networking technologies may use cryptography for secure communications and other operations. In order to perform cryptography, or encryption, a key may be generated using various different key generation algorithms. One or more keys may be used for symmetric or asymmetric encryption methods, among others. The key generation algorithms typically receive as input a so-called "seed" that is a random number. Thus, in order to generate a key for an encryption operation, a random number is first generated and supplied as input to the key generation algorithm. The security of the key used for encryption may accordingly depend on the quality of the random number generated and used as input.

In many typical applications, random numbers are digitally generated by information handling systems using algorithms available in the public domain. The security of the particular algorithm may rests not in the algorithm itself, but in the seed (random number) that is input to the algorithm. Accordingly, it is desirable and advantageous to use a secure seed in order to implement cryptographically strong random number generator algorithms. For example, the security of many real world applications and situations may depend on the quality of the random number used as a seed, such as but not limited to, session key generation, generation of keys for public key encryption using a cryptosystem, such as RSA, generation of a keystream for a stream cipher, and creation of a random nonce to prevent replay attacks.

However, in actuality, information handling systems that use digital processing are not typically capable of generating so-called "true" random numbers that originate from the variability of the physical world, which is ultimately based on entropy of matter. Because information handling systems operate in a deterministic manner and use deterministic algorithms to create random numbers, the random numbers generated by information handling system are not true random numbers, and such algorithms are referred to as "pseudo random number generators" or PRNG, in contrast to "true random number generators" or TRNG. Despite the deviation from a true random number, a pseudo random number can nonetheless pass many tests of randomness and can be useful for cryptography.

Accordingly, a TRNG typically involves a binary conversion of some analog source of entropy, which is the disorder, randomness, or variability in a closed system. An entropy source may thus be a noise source that produces random bit strings for use by a random number generator. Desirable characteristics of a TRNG include being non-deterministic and aperiodic, while undesirable characteristics of a TRNG include computational inefficiency for digital generation of the true random number.

In contrast to a TRNG, a PRNG may involve digital generation by a seed that is a bit string used as input to the PRNG algorithm. The seed will determine a portion of the internal state of the PRNG, while the entropy of the seed should be sufficient to support a desired level of security strength of the PRNG. Desirable characteristics of a PRNG include relative computational efficiency for digital generation of the pseudo-random number, while undesirable characteristics of a PRNG include being deterministic and periodic, at least to a certain degree.

As noted, quality random numbers are desirable for secure cryptography. While there is no single test or evaluation to prove true randomness of a bit string, there are nonetheless certain collections of tests that indicate a level of confidence or a relative measure of randomness of the bit string. These random number tests apply certain well-defined statistical properties to evaluate the quality of the bit string. For example, a distribution of the frequency of 0 and 1 in the bit string may be evaluated for uniformity, to prove that 0 and 1 occur with approximately equal frequency. The independence of certain subsequences in the bit string may be evaluated to determine that no single subsequence can be inferred from other subsequences. A forward unpredictability for elements in the bit string may verify that, if the seed is unknown, the next output bit in the bit string is unpredictable despite knowledge of previous bits in the bit string. A backward unpredictability for elements in the bit string may verify that the seed cannot be determined from knowledge of any generated values.

Thus, even though an information handling system does not employ TRNG, the information handling system can employ a cryptographically secure PRNG. With the cryptographically secure PRNG, an adversary who does not know the seed should be unable to determine the pseudo-random bit string, even when the PRNG algorithm is known. In the same way that the security of a cryptographic algorithm rests in the key, and not with the cryptographic algorithm (which is typically in the public domain), the security of a PRNG rests in the security of the seed, and not with the PRNG algorithm (which, also, is typically in the public domain). For these reasons, it is desirable and advantageous to use a secure seed in order to implement a cryptographically strong PRNG.

As described herein, a method and system of secure random seed generation for a cryptographically secure PRNG is disclosed. The method and system of secure random seed generation for a cryptographically secure PRNG disclosed herein may combine the speed and efficiency of a PRNG with the security and entropy of a TRNG. The method and system of secure random seed generation for a cryptographically secure PRNG disclosed herein may use a TRNG based on an entropy source that is a battery of an information handling system. The method and system of secure random seed generation for a cryptographically secure PRNG disclosed herein may leverage the natural variability of chemical compounds in the battery to generate true random numbers for use by cryptographic algorithms. The method and system of secure random seed generation for a cryptographically secure PRNG disclosed herein may generate a secure random seed with the TRNG using the entropy source as input. The method and system of secure random seed generation for a cryptographically secure PRNG disclosed herein may generate a pseudorandom bit stream with the PRNG using the secure random seed as input. The method and system of secure random seed generation for a cryptographically secure PRNG disclosed herein may operate based on the physical environment of the computer, rather than a user-dependent input, such as keystroke timing and mouse movements. The method and system of secure random seed generation for a cryptographically secure PRNG disclosed herein may be implemented in an embedded manner during pre-boot of an information handling system, in contrast to measuring sound input to the information handling system, for example. The method and system of secure random seed generation for a cryptographically secure PRNG disclosed herein may be implemented without specialized equipment, such as customized sensors to measure disk electrical activity and leaky capacitors.

Figure 2:
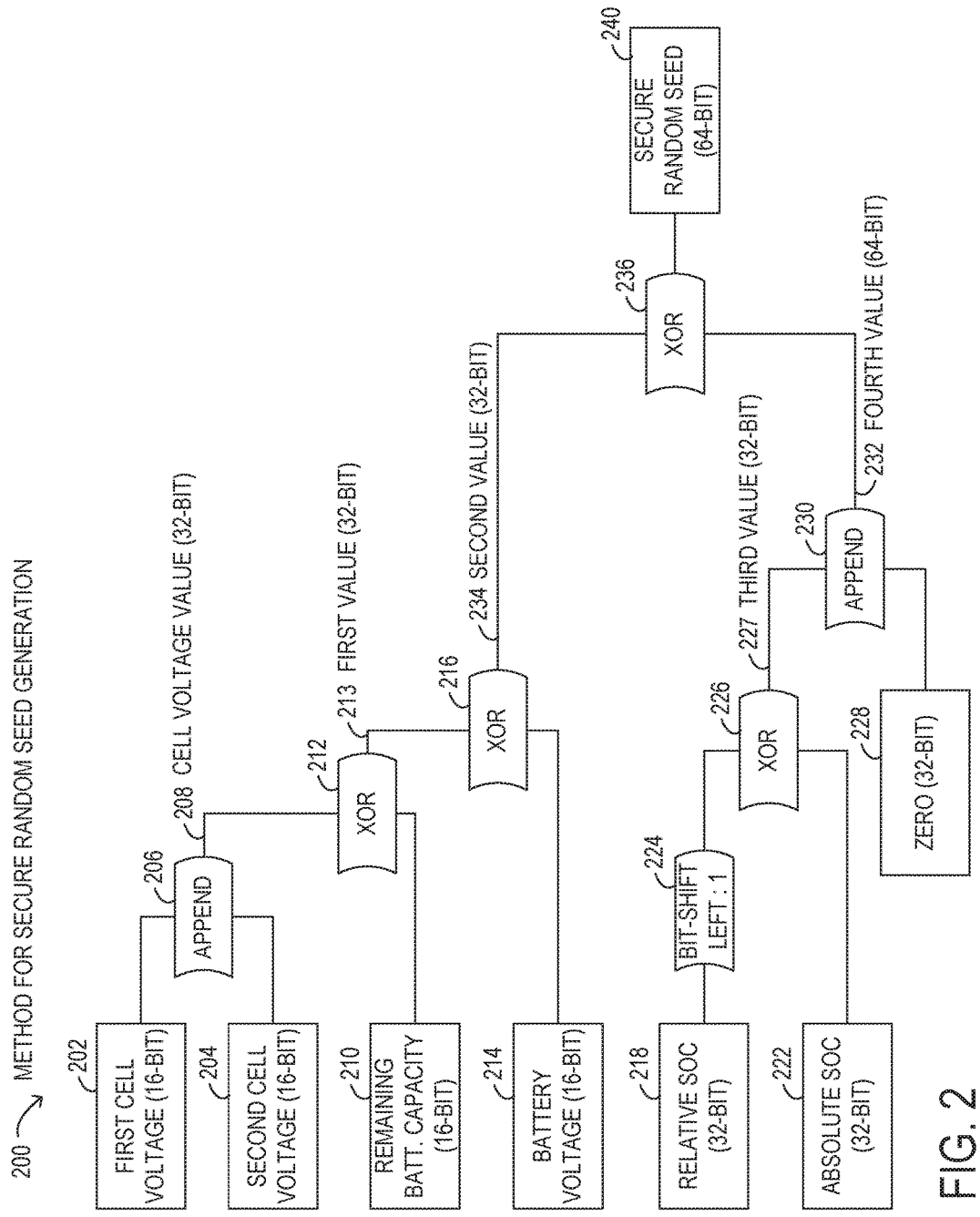
FIG. 2 is a data flow diagram of selected elements of a method for secure random seed generation for a cryptographically secure PRNG.
Figure 3:
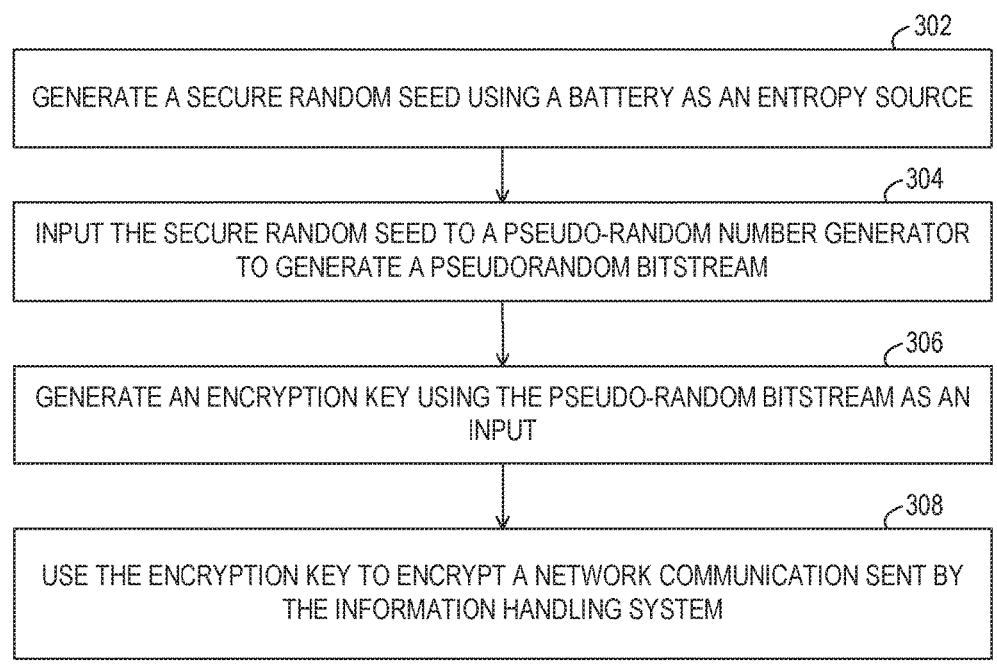
FIG. 3 is a flow chart of selected elements of a method for secure communication using the secure random seed generated in the method FIG. 2.

Particular embodiments are best understood by reference to FIGS. 1, 2 and 3 wherein like numbers are used to indicate like and corresponding parts.

Turning now to the drawings, FIG. 1 illustrates a block diagram depicting selected elements of an embodiment of portable information handling system 100. It is noted that FIG. 1 is not drawn to scale but is a schematic illustration. In various embodiments, portable information handling system 100 may represent different types of portable devices. A portable device may generally be any device that a user may carry for handheld use and that includes a processor. Typically, portable devices are powered using a rechargeable battery. Examples of portable information handling system 100 may include laptop computers, notebook computers, netbook computers, tablet computers, and 2-in-1 tablet laptop combination computers, among others. In some instances, portable information handling system 100 may represent certain personal mobile devices, and may further include examples such as media players, personal data assistants, digital cameras, cellular phones, cordless phones, smart phones, and other cellular network devices.

As shown in FIG. 1, components of information handling system 100 may include, but are not limited to, a processor subsystem 120, which may comprise one or more processors, and a system bus 121 that communicatively couples various system components to processor subsystem 120 including, for example, a memory 130, an I/O subsystem 140, local storage resource 150, and a network interface 160. Also shown within information handling system 100 is embedded controller 180 and an internal battery management unit (BMU) 170 that manages an internal battery 171. Furthermore, information handling system 100 is shown removably coupled to a DC line power 146 that may supply electrical power for operation of information handling system 100, including for charging internal battery 171.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource).

In FIG. 1, system bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also in FIG. 1, memory 130 may comprise a system, device, or apparatus operable to retain and retrieve program instructions and data for a period of time (e.g., computer-readable media). Memory 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory 130 is shown including an operating system (OS) 132, which may represent an execution environment for portable information handling system 100. Operating system 132 may be UNIX or be based on UNIX (e.g., a LINUX variant), one of a number of variants of Microsoft Windows® operating systems, a mobile device operating system (e.g., Google Android™ platform, Apple® iOS, among others), an Apple® MacOS operating system, an embedded operating system, a gaming operating system, or another suitable operating system.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while portable information handling system 100 is operating.

Also shown in FIG. 1 is embedded controller (EC) 180, which may include EC processor 182 as a second processor included within portable information handling system 100 for certain management tasks, including supporting communication and providing various functionality with respect to internal BMU 170. Thus, EC processor 182 may have access to EC memory 184, which may store EC firmware 186, representing instructions executable by EC processor 182. As shown, EC firmware 186 includes a battery PRNG 185, which may represent executable code for secure random seed generation for a cryptographically secure PRNG, as disclosed herein.

In some embodiments, EC firmware 186 may include pre-boot instructions executable by EC processor 182. For example, EC firmware 186 may be operable to prepare information handling system 100 to boot by activating various hardware components in preparation of launching an operating system for execution. Accordingly, in some embodiments, EC firmware 186 may include a basic input/output system (BIOS). In certain embodiments, EC firmware 186 includes a Unified Extensible Firmware Interface (UEFI) according to a specification promulgated by the UEFI Forum (uefi.org). Embedded controller 180 may execute EC firmware 186 on EC processor 182 even when other components in information handling system 100 are inoperable or are powered down. Furthermore, EC firmware 186 may be in control of EC communication interface(s) 188, which may represent one or more input/output interfaces or signals that embedded controller 180 can use to communicate with other elements of information handling system 100, such as processor subsystem 120 or I/O subsystem 140, among others.

As illustrated in FIG. 1, portable information handling system 100 may include a battery management unit (BMU) 170 that controls operation of internal battery 171. In particular implementations, BMU 170 may be embedded within a respective battery whose operation BMU 170 controls. For example, internal BMU 170 within portable information handling system 100 may control operation of an internal battery 171. More specifically, BMU 170 may monitor information associated with, and control charging operations of, internal battery 171. In operation, BMU 170 may control operation of internal battery 171 to enable sustained operation, such as by protecting internal battery 171. Protection of internal battery 171 by BMU 170 may comprise preventing internal battery 171 from operating outside of safe operating conditions, which may be defined in terms of certain allowable voltage and current ranges over which internal battery 171 can be expected to operate without causing self-damage. For example, the BMU 170 may modify various parameters in order to prevent an over-current condition (whether in a charging or discharging mode), an over-voltage condition during charging, an under-voltage condition while discharging, or an over-temperature condition, among other potentially damaging conditions.

As used herein, "top-of-charge voltage" (or "TOC" voltage) refers to a voltage threshold used during a charge cycle of a battery to determine a 100% charge level. It is noted that the top-of-charge voltage set on a given battery may be lower than a "maximum charge voltage", which may specify a maximum voltage that a given battery having a given battery chemistry can safely endure during charging without damage. As used herein, the terms "state of charge", "SOC", or "charge level" refer to an actual charge level of a battery, from 0% to 100%, for example, based on the currently applied top-of-charge voltage. The SOC may be correlated to an actual voltage level of the battery, for example, depending on a particular battery chemistry.

In some embodiments, internal battery 171 illustrated in FIG. 1 may be considered to be discharged when an SOC of the battery corresponds to an SOC that is below a predetermined threshold percentage or amount below the 100% charge level given by the TOC voltage, such as below a 5% charge level in one example. Internal battery 171 may be considered to be charged, i.e., at least partially charged, when the SOC for the battery corresponds to an SOC that is above a first predetermined threshold percentage or amount below the 100% charge level given by the TOC voltage, such as above the 25% charge level in one example. Internal battery 171 may be considered to be fully charged when the SOC of the battery corresponds to an SOC that is above a second predetermined threshold percentage or amount below the 100% charge level given by the TOC voltage, such as above the 95% charge level for example. Internal battery 171 may be considered to be at least partially discharged when the SOC of the battery corresponds to an SOC that is below the 100% charge level. The parameters for specifying an SOC described above are examples and may be modified using different values in different embodiments.

In various embodiments, internal battery 171 illustrated in FIG. 1 may include one or more cells having a particular chemistry in a particular cell configuration. For example, in one embodiment, internal battery 171 may include four Lithium-ion cells in a two parallel-two serial (2S-2P) configuration. In other embodiments, internal battery 171 may include a different number of cells or may include multiple cells in a different configuration. For example, internal battery 171 may include three or more cells in various configurations. In some embodiments, internal battery 171 may include one or more cells based on any one of a variety of Lithium-ion electrochemistries, or one or more cells based a different electrochemistry than Lithium-ion.

In various embodiments, internal battery 171 may include at least certain portions of a main power circuit across positive and negative terminals, a current sensor, a voltage sensor, one or more battery cells, a fuse, and a power switch (not shown). The current sensor may represent a shunt resistor, or other current sensing element, over which a voltage that is directly proportional to the current flowing through the main power circuit is measured. The battery cells may store and output electrical energy based on a given electrochemical composition internal to the battery cells. The voltage sensor may enable voltage measurement of individual battery cells, or measurement of an aggregate voltage for the battery including all battery cells operating together. The temperature sensor may be located in proximity to the battery cells to provide an accurate indication of a temperature within the battery. The fuse may be a safety element for limiting current flowing through the main power circuit. The power switch may be an electronically controlled switching element that closes or opens the main power circuit, and thereby allows the battery to operate for charging or discharging.

In FIG. 1, BMU 170 may include a charging unit (CU) 174 that may control charging cycles for internal battery 171 and may apply a TOC voltage as a threshold to determine when charging is complete as the battery voltage increases during charging. The TOC voltage may be lower than or equal to the maximum charge voltage that internal battery 171 can physically sustain, in different embodiments. Depending on the actual value for the TOC voltage, a given energy capacity may be stored using internal battery 171. BMU 170 may also be enabled to obtain various types of information associated with internal battery 171 and to make decisions according to the obtained information. For example, BMU 170 may monitor various charging-related parameters or other operating parameters received from one or more battery cells in internal battery 171.

In some embodiments, parameters monitored by a BMU 170 may include a charging current, a voltage, a battery impedance, and a temperature associated with internal battery 171. More specifically, the parameters monitored by the BMU 170 may include any or all of the cell configuration and chemistry of battery cells within internal battery 171, the total voltage of internal battery 171, the voltages of individual battery cells in internal battery 171, minimum or maximum cell voltages, the average temperature of internal battery 171 as a whole, the temperatures of individual battery cells in internal battery 171, the SOC of internal battery 171, the depth of discharge of internal battery 171, the current flowing into internal battery 171, the current flowing out of internal battery 171, and any other measurement of the overall condition of internal battery 171, in various embodiments. In some embodiments, monitoring the SOC may include continuous or periodic monitoring of output current, voltage, or both for internal battery 171. In some cases, Coulomb counting, in which the charge delivered or stored by a battery is tracked, is used for monitoring of internal battery 171. In some embodiments, a battery temperature may be monitored through the use of periodic voltage measurements, a thermometer, or any other method to detect or correct for variations in temperature. In some embodiments, at least some of the parameters monitored by BMU 170 may be used internally by BMU 170 for internal battery management operations. In some embodiments, at least some of the parameters monitored by BMU 170 may be provided to battery PRNG 185 to implement the methods disclosed herein for secure random seed generation for a cryptographically secure PRNG.

In some embodiments, BMU 170 may calculate additional values, based on the monitored battery parameters or other information obtained from a battery, for example, in order to make decisions related to the charging and operation of the battery. For example, BMU 170 may calculate any or all of a charge current limit (CCL), a discharge current limit (DCL), a total amount of energy delivered, an amount of energy delivered since the last charge, an amount of charge delivered or stored, a number of charging cycles, a total operating time, and an operating time since the last charge. In some embodiments, BMU 170, or another component of portable information handling system 100, may analyze and compare monitored parameter values to historic values or predicted models relative to an SOC of the battery, and may calculate the remaining battery life. Remaining battery life may refer to a duration or a fraction of a time period remaining that a battery may safely provide electrical power, an amount or a fraction of a voltage drop remaining over which a battery may safely provide electrical power, or an amount or fraction of a discharge capacity remaining that a battery may safely provide electrical power. For example, a remaining battery capacity may be measured in mWh by BMU 170. Based on the obtained and calculated values, BMU 170 may detect various alert conditions associated with a battery, conditions such as battery charge full, battery charge empty, battery charging, battery discharging, battery over temperature, battery over current, other battery system status conditions, or various combinations thereof.

In certain embodiments, BMU 170 may include a processor and memory (not shown). The memory may store instructions executable by the processor to perform one or more of the methods described herein for obtaining and calculating values related to the operation and charging of a battery and for controlling the operation and charging of the battery. The memory may also store data, obtained and calculated values, thresholds, and parameters related to the methods described herein. In particular, the memory may store values related to secure random seed generation for a cryptographically secure PRNG, as disclosed herein.

As will be described in further detail herein, in operation, a method and system of secure random seed generation for a cryptographically secure PRNG generates the secure random seed from the natural entropy of the chemical compounds found in information handling system batteries, such as Li-ion batteries. The method of secure random seed generation for a cryptographically secure PRNG may be executed by EC processor 182 executing battery PRNG 185. The secure random seed may be used by EC 160 exclusively, such as for cryptographic operations to establish a root-of-trust in information handling system 100. For example, the UEFI Specification, § 35 describes an interface for a random number generator that UEFI implementations, such as EC firmware 186, may implement. In some implementations, the secure random seed may be exposed to OS 132 for use by applications executed by processor subsystem 120.

In particular, the method and system of secure random seed generation for a cryptographically secure PRNG disclosed herein may generate a 64-bit secure random seed, which is commonly used in cryptographic systems, such as the American National Standards Institute (ANSI) X9.17, Blum-Blum-Shub, and the Federal Information Processing Standard (FIPS) 186, among other PRNGs that may receive the secure random seed disclosed herein.

Furthermore, the method and system of secure random seed generation for a cryptographically secure PRNG disclosed herein has been evaluated using standards published by the National Institute of Standards and Technology (NIST). Specifically, NIST publication SP 800-22 Rev 1a discloses a suite of tests that can be performed to evaluate the randomness of a bit stream. In addition, NIST publication SP 800-22 Rev 1a provides source code for the NIST Statistical Test Suite program that can run the tests on popular PRNGs, or a custom RNG. The results of the NIST Statistical Test Suite v2.1.2 for the method of secure random seed generation for a cryptographically secure PRNG disclosed herein are shown below in Table 1. The results in Table 1 were obtained using real-world battery data collected from the field, and include benchmarks against several popular PRNGs.

TABLE 1

Results of NIST Statistical Test Suite v2.1.2

| RNG METHOD | FREQ. TEST | RUNS TEST | DFT TEST | APPROX. ENTROPY TEST | LINEAR COMPLEXITY TEST |
|---|---|---|---|---|---|
| Present Disclosure | 29726 | 29912 | 29878 | 29736 | 854 |
| Blum-Blum-Shub | 29802 | 29709 | 29923 | 29669 | 375 |
| Linear-Congruential | 29812 | 29666 | 29921 | 29659 | 384 |
| Cubic-Congruential | 29811 | 29703 | 29916 | 29662 | 421 |
| Quadratic-Congruential-1 | 29785 | 29672 | 29930 | 29607 | 236 |
| Quadratic-Congruential-2 | 29811 | 29686 | 29924 | 29654 | 413 |

TABLE 1-continued

Results of NIST Statistical Test Suite v2.1.2

| RNG METHOD | FREQ. TEST | RUNS TEST | DFT TEST | APPROX. ENTROPY TEST | LINEAR COMPLEXITY TEST |
|---|---|---|---|---|---|
| Micali-Schnorr | 29799 | 29656 | 29909 | 29613 | 443 |
| G using SHA-1 | 28615 | 16508 | 29792 | 12697 | 0 |

In Table 1, five (5) tests from the NIST Statistical Test Suite v2.1.2 on 30,000 random number samples are shown for the present disclosure (bold) and for seven other random number generation (RNG) algorithms. In addition, a Universal Statistical Test scored all RNG methods shown in Table 1 with a pass result. The results in Table 1 indicate that the methods of secure random seed generation for a cryptographically secure PRNG disclosed herein scored above all other RNG methods tested for 3 tests (Runs Test, Approximate Entropy Test, and Linear Complexity Test).

Referring now to FIG. 2, a data flow diagram 200 of selected elements of an embodiment of method of secure random seed generation for a cryptographically secure PRNG, as described herein, is depicted in flowchart form. Data flow diagram 200 depicts an algorithm for calculation of a 64-bit secure random seed 240 shown on the right side. Accordingly, data flow diagram 200 may be read from left to right with connecting lines representing values sent to nodes that represent operations on the values. The method shown in data flow diagram 200 may be may be performed using portable information handling system 100, and specifically, by battery PRNG 185 executing on EC 180 in conjunction with internal BMU 170 and charging unit 174, as described above.

In data flow diagram 200, a first cell voltage 202 an a second cell voltage 204 are obtained as 16-bit values. In one example, first cell voltage 202 may be obtained from a measurement of a cell voltage of a first cell in internal battery 171, while second cell voltage 204 may be obtained from a measurement of a cell voltage of a second cell in internal battery 171. In another example, such as when the battery has a single cell, first cell voltage 202 may be obtained from a first measurement of a cell voltage, while second cell voltage 204 may be obtained from a second measurement of the cell voltage. Various other procedures and combinations of measurements from one or more cells may be used to obtain first cell voltage 202 and second cell voltage 204. Furthermore, in different implementations, other measured values from internal battery 171 that are indicative of the entropy of internal battery 171 may be used in place of first cell voltage 202 and second cell voltage 202. For example, one or more battery temperatures may be used in place of first cell voltage 202 or second cell voltage 202. In another example, an internal impedance of internal battery 171 may be used in place of first cell voltage 202 and second cell voltage 202. From the cell voltages, a respective digital value using the least significant digits or bits may be used to generate the respective 16-bit values 202, 204. Then, at append node 206, first cell voltage 202 and second cell voltage 204 are appended (or concatenated) to generate a cell voltage value 208 that is a 32-bit value. A remaining battery capacity (measured in mWh) 210 as a 16-bit value of least significant bits may then be sent to an exclusive or (XOR) node 212 along with cell voltage value 208, which outputs first value 213 as a 32-bit value. A battery voltage 218 may be sent to an XOR node 216 along with first value 213, which outputs a second value 234 as a 32-bit value. A relative SOC 218 may be obtained as a 32-bit value from a measurement of internal battery 171 and may be relative to a currently actual battery capacity of internal battery 171. At node 224, relative SOC 218 is bit shifted left by 1 bit and the result sent to an XOR node 226, along with an absolute SOC 222 of internal battery 171 as a 32-bit value, which outputs a third value 227 as a 32-bit value. Third value 227 is appended at node 230 with a 32-bit zero value 228, which results in a fourth value 232 as a 64-bit value. At XOR node 236, second value 234 and fourth value 232 are received and result in secure random seed 240 as a 64-bit value.

Referring now to FIG. 3, a flow chart of selected elements of an embodiment of method 300 for secure communication using secure random seed 240 generated in FIG. 2, as described herein, is depicted in flowchart form. Method 200 may be performed using portable information handling system 100, for example, using network interface 160, among other elements. It is noted that certain operations described in method 300 may be optional or may be rearranged in different embodiments.

Method 300 may begin at step 302 generating a secure random seed using a battery as an entropy source. Step 302 may be performed using operations described in data flow diagram 200 in FIG. 2. At step 304, the secure random seed is input to a pseudo-random number generator to generate a pseudorandom bit stream. At step 306, an encryption key is generated using the pseudo-random bit stream as an input. The encryption key may be a symmetric key or an asymmetric key. At step 308, the encryption key is used to encrypt a network communication sent by the information handling system.

As disclosed herein, a method and system for generating a secure random seed uses chemical processes in a battery of an information handling system as an entropy source for true randomness. The secure random seed may be used by a pseudorandom number generator to create a secure pseudorandom bit stream usable to generate secure encryption keys.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a main processor;
   a battery;
   an embedded controller (EC) further comprising an EC processor; and
   memory media accessible to the EC processor and storing instructions executable by the EC processor for:
      determining a first cell voltage of the battery as a 16-bit value;
      determining a second cell voltage of the battery as a 16-bit value;
      concatenating the first cell voltage and the second cell voltage to obtain a cell voltage value as a 32-bit value;
      determining a remaining battery capacity of the battery as a 16-bit value;
      determining a battery voltage of the battery as a 16-bit value;

determining a relative state of charge (SOC) of the battery as a 32-bit value;

determining an absolute SOC of the battery as a 32-bit value;

performing an exclusive or (XOR) of the cell voltage value with the remaining battery capacity to generate a first value as a 32-bit value;

performing an XOR of the first value with the battery voltage to generate a second value as a 32-bit value;

performing an XOR of the relative SOC left-shifted by one bit with the absolute SOC to generate a third value as a 32-bit value;

shifting the third value to most significant bits of a 64-bit value to generate a fourth value; and performing an XOR of the fourth value with the second value to generate a 64-bit secure random seed, wherein an entropy source for the secure random seed includes the battery.

2. The information handling system of claim 1, wherein determining the first cell voltage further comprises:

obtaining a cell voltage in Volts from a measurement of the first cell; and using least significant 16-bits of the cell voltage as the first cell voltage.

3. The information handling system of claim 1, wherein determining the second cell voltage further comprises:

obtaining a cell voltage in Volts from a measurement of the second cell; and using least significant 16-bits of the cell voltage as the second cell voltage.

4. The information handling system of claim 1, wherein determining the remaining battery capacity further comprises:

obtaining a remaining battery capacity value in milliwatt hours from a measurement of the battery; and using least significant 16-bits of the remaining battery capacity value as the remaining battery capacity.

5. The information handling system of claim 1, wherein determining the battery voltage further comprises:

obtaining a battery voltage value in Volts from a measurement of the battery; and using least significant 16-bits of the battery voltage value as the battery voltage.

6. A method for secure communication, the method comprising:

determining a first cell voltage of a battery of an information handling system as a 16-bit value;

determining a second cell voltage of the battery as a 16-bit value;

concatenating the first cell voltage and the second cell voltage to obtain a cell voltage value as a 32-bit value;

determining a remaining battery capacity of the battery as a 16-bit value;

determining a battery voltage of the battery as a 16-bit value;

determining a relative state of charge (SOC) of the battery as a 32-bit value;

determining an absolute SOC of the battery as a 32-bit value;

performing an exclusive or (XOR) of the cell voltage value with the remaining battery capacity to generate a first value as a 32-bit value;

performing an XOR of the first value with the battery voltage to generate a second value as a 32-bit value;

performing an XOR of the relative SOC left-shifted by one bit with the absolute SOC to generate a third value as a 32-bit value;

shifting the third value to most significant bits of a 64-bit value to generate a fourth value;

performing an XOR of the fourth value with the second value to generate a 64-bit secure random seed, wherein an entropy source for the secure random seed includes the battery;

inputting the secure random seed to a pseudo-random number generator to generate a 64-bit pseudorandom bit stream;

generating an encryption key using the 64-bit pseudo-random bit stream as an input; and using the encryption key to encrypt a network communication sent by the information handling system.

7. The method of claim 6, wherein determining the first cell voltage further comprises:

obtaining a cell voltage in Volts from a measurement of the first cell; and using least significant 16-bits of the cell voltage as the first cell voltage.

8. The method of claim 6, wherein determining the second cell voltage further comprises:

obtaining a cell voltage in Volts from a measurement of the second cell; and using least significant 16-bits of the cell voltage as the second cell voltage.

9. The method of claim 6, wherein determining the remaining battery capacity further comprises:

obtaining a remaining battery capacity value in milliwatt hours from a measurement of the battery; and using least significant 16-bits of the remaining battery capacity value as the remaining battery capacity.

10. The method of claim 6, wherein determining the battery voltage further comprises:

obtaining a battery voltage value in Volts from a measurement of the battery; and using least significant 16-bits of the battery voltage value as the battery voltage.

11. Non-transitory computer readable memory media storing instructions executable by a processor for:

determining a first cell voltage of a battery of an information handling system as a 16-bit value;

determining a second cell voltage of the battery as a 16-bit value;

concatenating the first cell voltage and the second cell voltage to obtain a cell voltage value as a 32-bit value;

determining a remaining battery capacity of the battery as a 16-bit value;

determining a battery voltage of the battery as a 16-bit value;

determining a relative state of charge (SOC) of the battery as a 32-bit value;

determining an absolute SOC of the battery as a 32-bit value;

performing an exclusive or (XOR) of the cell voltage value with the remaining battery capacity to generate a first value as a 32-bit value;

performing an XOR of the first value with the battery voltage to generate a second value as a 32-bit value;

performing an XOR of the relative SOC left-shifted by one bit with the absolute SOC to generate a third value as a 32-bit value;

shifting the third value to most significant bits of a 64-bit value to generate a fourth value; and performing an XOR of the fourth value with the second value to generate a 64-bit secure random seed, wherein an entropy source for the secure random seed includes the battery.

12. The memory media of claim 1, wherein determining the first cell voltage further comprises:
   obtaining a cell voltage in Volts from a measurement of the first cell; and
   using least significant 16-bits of the cell voltage as the first cell voltage.

13. The memory media of claim 11, wherein determining the second cell voltage further comprises:
   obtaining a cell voltage in Volts from a measurement of the second cell; and
   using least significant 16-bits of the cell voltage as the second cell voltage.

14. The memory media of claim 11, wherein determining the remaining battery capacity further comprises:
   obtaining a remaining battery capacity value in milliwatt hours from a measurement of the battery; and
   using least significant 16-bits of the remaining battery capacity value as the remaining battery capacity.

15. The memory media of claim 11, wherein determining the battery voltage further comprises:
   obtaining a battery voltage value in Volts from a measurement of the battery; and
   using least significant 16-bits of the battery voltage value as the battery voltage.

16. The memory media of claim 11, wherein the processor is an embedded controller processor in an information handling system that further comprises a main processor.

\* \* \* \* \*